No. 666,689.  
I. M. PHILLIPS.  
LAWN RAKE.  
(Application filed June 18, 1900.)

Patented Jan. 29, 1901.

(No Model.)

2 Sheets—Sheet 1.

WITNESSES:  
F. B. Townsend  
H. W. Munday

INVENTOR  
Irving M. Phillips  
BY Munday, Evarts & Adcock  
ATTORNEY.

THE NORRIS PETERS CO., PHOTO-LITHO., WASHINGTON, D. C.

No. 666,689. Patented Jan. 29, 1901.
I. M. PHILLIPS.
LAWN RAKE.
(Application filed June 18, 1900.)
(No Model.) 2 Sheets—Sheet 2.
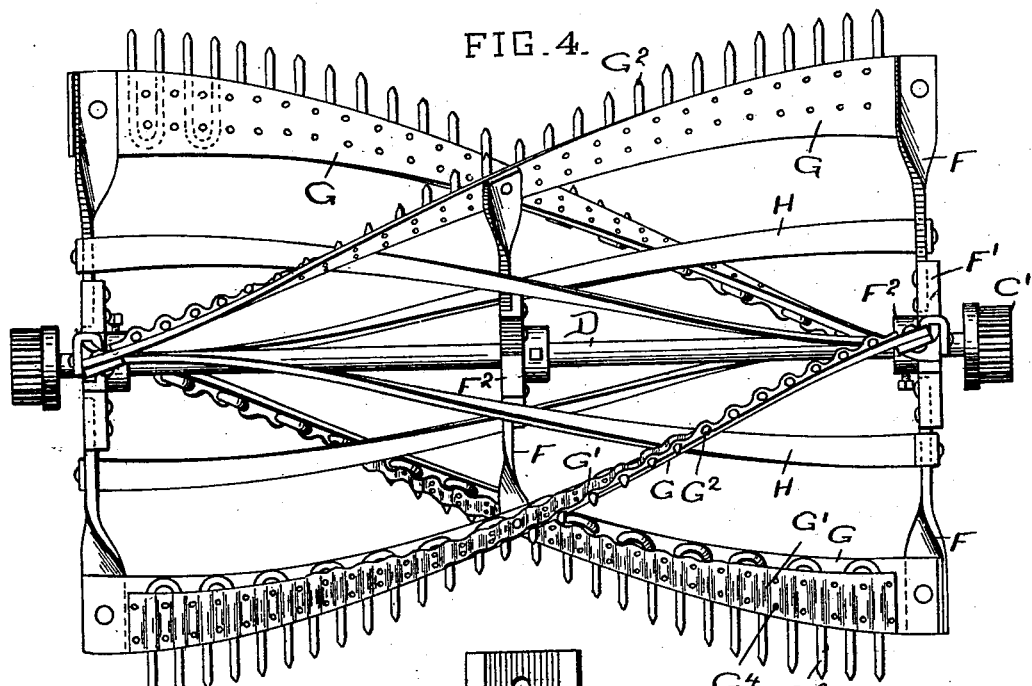
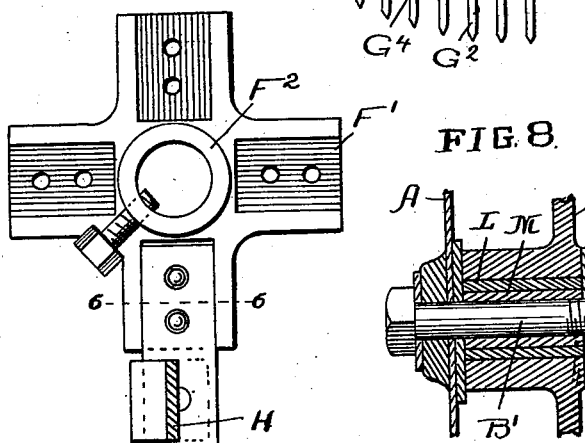
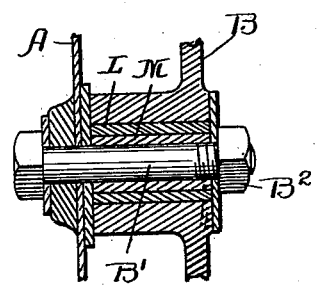
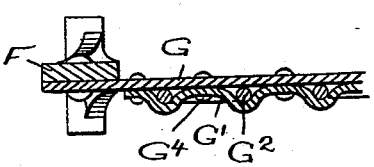
WITNESSES:
F. B. Townsend
H. W. Munday
INVENTOR.
Irving M. Phillips
BY Munday, Evarts & Adcock
ATTORNEYS.

UNITED STATES PATENT OFFICE.

IRVING M. PHILLIPS, OF JOLIET, ILLINOIS, ASSIGNOR TO THE FINLEY LAWN RAKE COMPANY, OF SAME PLACE.

LAWN-RAKE.

SPECIFICATION forming part of Letters Patent No. 666,689, dated January 29, 1901.

Application filed June 18, 1900. Serial No. 20,685. (No model.)

*To all whom it may concern:*

Be it known that I, IRVING M. PHILLIPS, a citizen of the United States, residing in Joliet, in the county of Will and State of Illinois, have invented a new and useful Improvement in Lawn-Rakes, of which the following is a specification.

This invention relates to certain improvements in raking-machines adapted to be used on lawns and to be propelled by hand.

The invention is designed to provide a strong, simple, easily-operated, efficient, and durable construction of rake at a moderate cost.

The invention consists in the novel devices and in the novel combinations of parts and devices herein shown and described, and specified in the claims.

Figure 1:
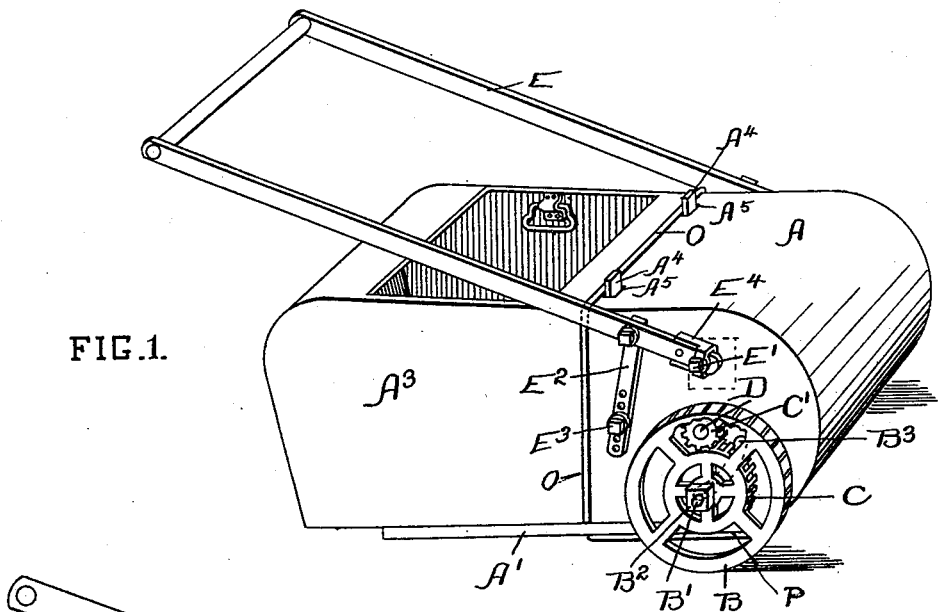
Figure 2:
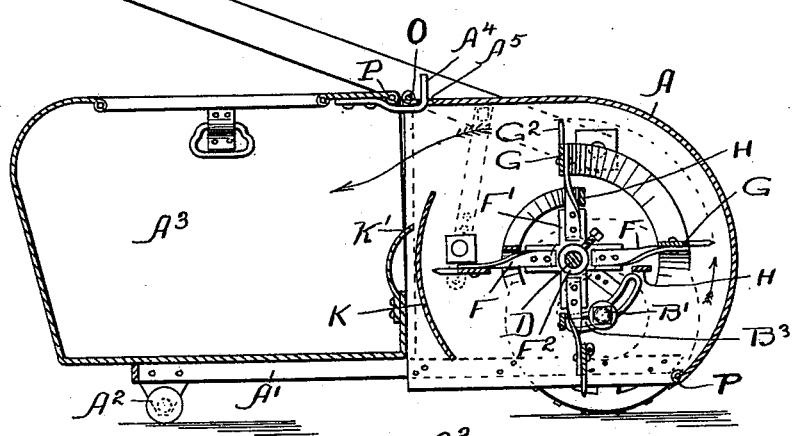
Figure 3:
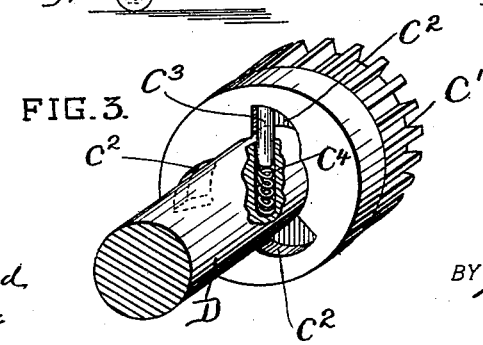

In the accompanying drawings, forming a part of this specification, Figure 1 is a perspective of my improved rake. Fig. 2 is a longitudinal vertical section. Fig. 3 is a perspective of the clutch for driving the rake. Fig. 4 is an enlarged elevation of the rake proper detached from the machine. Fig. 5 is a still further enlarged detail of a portion of the rake. Figs. 6 and 7 are sections on the lines 6 6 and 7 7, respectively, of Fig. 5; and Fig. 8 is a partial section of one of the drive-wheels.

In said drawings, A represents a box or casing surrounding the raking device and supported at each side upon wheels B, attached to the casing by journal-bolts $B'$ and nuts $B^2$. The journal-bolts pass through slots $B^3$ in the side of the casing, and these slots permit the adjustment of the journal-bolts so as to increase or decrease the height of the machine from the ground. A strap-metal frame $A'$ is attached to the lower edge of the casing A and extends backward, as shown, and at its rear end is provided with a supporting-roller $A^2$, and this frame prevents the backward tipping of the casing A and also supports the grass or refuse receptacle $A^3$, which may be detachably joined to the casing A by means of hooks $A^4$, adapted to be passed upward through openings $A^5$ in the rear upper edge of casing A.

The rake is driven by means of the U-shaped handle E, the arms of which are secured to the sides of the casing A by pivot-bolts $E'$. The handles are given their proper inclination by means of arms $E^2$, secured to the sides of casing A by bolts $E^3$. A series of openings are shown in these arms $E^2$, intended to permit changes in the height of the handle, so as to render the machine convenient to be used by tall as well as short persons. The ends of the handles are preferably inserted in holders $E^4$, which encircle them and also receive the pivot-bolts $E'$.

The wheels B are made integral with gears C, which mesh with drive-pinions $C'$ on the ends of the shaft D, upon which the rake proper is mounted. The pinions have a clutching connection with the shaft D, which is fully illustrated in Fig. 3, the hub of the pinion being provided with a series of recesses $C^2$, each of which is adapted to receive a radially-moving pin $C^3$, let into the shaft D and actuated by the spring $C^4$. The recesses are abrupt at one side and curved at the other, so that when the pinion rotates in one direction the pin $C^3$ engages the abrupt side; but when the movement is reversed the pin is simply forced into the shaft without acting thereon. By this construction the rake is prevented from rotating when the machine is moved backward.

The rake proper consists of four spiral blades carrying the rake-teeth and mounted upon arms F, which are let into and riveted to the recessed arms $F'$ of hubs $F^2$, secured upon the shaft D. The arms F are preferably of wrought metal twisted so that one end may conform to the hub and the other end to the blade. The blades are shown at G, and the rake-teeth are attached to them by means of clamping-plates $G'$, which may be of lighter material than the blades and which are shaped to conform to and are riveted to the blades between the rake-teeth $G^2$. The latter are preferably made of wire bent into the form of staples, each staple thus forming two teeth. They are held against inward movement by bending over the inward edge of the blades, as shown at $G^3$, and they are prevented from moving outward by the compression of the plate $G'$ and also by the rivets $G^4$, attaching said plates to the rake-blades, some of the rivets being driven between the limbs of the staples. The blades are attached to the arms F by rivets. This construction of rake I have found to be admirably adapted to the uses for which the machine is intended, and it is also economical of manufacture.

In order to break up the air-currents and prevent any tendency of the rake to throw the refuse mainly toward one side of the machine, I attach to the arms F a series of flat metal vanes H. These vanes are secured to the arms between the raking-blades and the axis and they are curved in a direction opposite the curve given the blades. By these vanes the tendency above mentioned is corrected.

Back of the rotating rake I provide the casings with a curved plate K, extending from the bottom opening up to the opening through which the refuse is discharged into the grass-receptacle. This plate is concentric with the rake, and it prevents the formation back of the rake of any air-eddies, which might otherwise be formed and in which much of the refuse might be caught, and thus fail to reach the receptacle $A^3$. This plate extends from end to end of the casing, as will be understood.

Between the supporting-wheels and their pivot-bolts $B'$ bushings are interposed, which are composed of concentric tubes L and M of different metals, the outer one being of brass and the inner one of iron tubing. These tubes are made fast together, so that neither can turn independently by forcibly driving the inner one into the outer one, and I thereby obtain the advantage of a brass wearing-surface at very moderate cost.

The rear top and side edges of casing A are strengthened by a continuous wire O and its bottom, front, and side edges by a similar wire P.

The front of the receptacle $A^3$ is preferably curved, so as to carry its upper edge $K'$ into proximity to the deflector K.

The machine is operated by pushing it over the lawn after the manner in which lawn-mowers are used. This causes a rapid rotation of the rake and creates a strong blast of air from the rake-casing into the receptacle $A^3$, by which blast the loose grass and leaves picked up by the rake-teeth will be transferred into said receptacle. The force of the blast is dissipated immediately upon its entrance to the receptacle by the large opening in the top thereof, (plainly appearing in Fig. 1,) and this allows the grass and leaves to settle to the bottom of the receptacle. The blast is rendered even in its action throughout the width of the machine by the vanes H. The height of the handle-bar is adjusted to suit the height of the user, and the position of the rake relative to the ground is regulated by adjusting the journal-bolts in the slots $B^3$.

I claim—

1. The lawn-rake consisting of a casing A, adjustable carrying-wheels B, a revolving rake located in said casing and having a clutching connection to said wheels, and also having vanes for breaking up the air-currents, a refuse-receptacle $A^3$ receiving the grass and leaves from the rake, and a rear frame and roller for supporting said receptacle, substantially as specified.

2. The lawn-rake having a revolving rake embodying spirally-curved blades carrying the rake-teeth, and vanes curved spirally but reversed from the curve of the blades, substantially as specified.

3. The lawn-rake having a revolving rake embodying spirally-curved blades carrying rake-teeth, and vanes located between the blades and the axis and serving to break up the air-currents, substantially as specified.

4. The lawn-rake wherein are combined a revolving rake having its teeth carried by spirally-curved blades supported upon radiating arms, and a refuse-receptacle located back of and receiving the grass and leaves thrown up by the rake, said rake having vanes inside the blades for preventing uneven action by the rake, substantially as specified.

5. The revolving rake embodying blades G, plates $G'$, and rake-teeth $G^2$ clamped between said blades and plates, the plates $G'$ being made to conform to the teeth, substantially as specified.

6. The revolving rake, consisting of blades mounted upon the twisted arms F radiating from the shaft, said arms, teeth carried by said blades, and plates riveted to the blades and clamping the teeth thereto, substantially as specified.

7. The revolving rake embodying blades carrying the rake-teeth and having their inner edges bent over to form a stop to the teeth, and plates riveted to the blades and clamping the teeth thereto, substantially as specified.

8. The revolving rake embodying blades for carrying the teeth, and having their inner edges bent over as shown, a series of staples forming the teeth, and plates riveted to the blades and clamping the teeth thereto, substantially as specified.

9. The combination of the blades, the staples forming the teeth, and the clamping-plates, the plates being riveted to the blades between the limbs of the staples, the blades having their inner edges bent over to act as a stop to the staples, substantially as specified.

10. The combination with the casing and the revolving rake therein, of the supporting-wheels having gears meshing with pinions on the rake-shaft, said wheels being adjustable and held to the casing by journals passing through curved slots, substantially as specified.

11. The revolving rake embodying a shaft, hubs having radiating recessed arms F', twisted arms F inserted in said arms F', and toothed blades and air-vanes attached to said arms F, substantially as specified.

12. The revolving rake, consisting of a shaft, hubs having recessed arms F', twisted arms F inserted in said hub-arms, and spiral tooth-carrying blades and spiral vanes attached to said arms F, substantially as specified.

IRVING M. PHILLIPS.

Witnesses:
FRED BENNETT,
CHARLES E. FINLEY.